Patented Mar. 8, 1927.

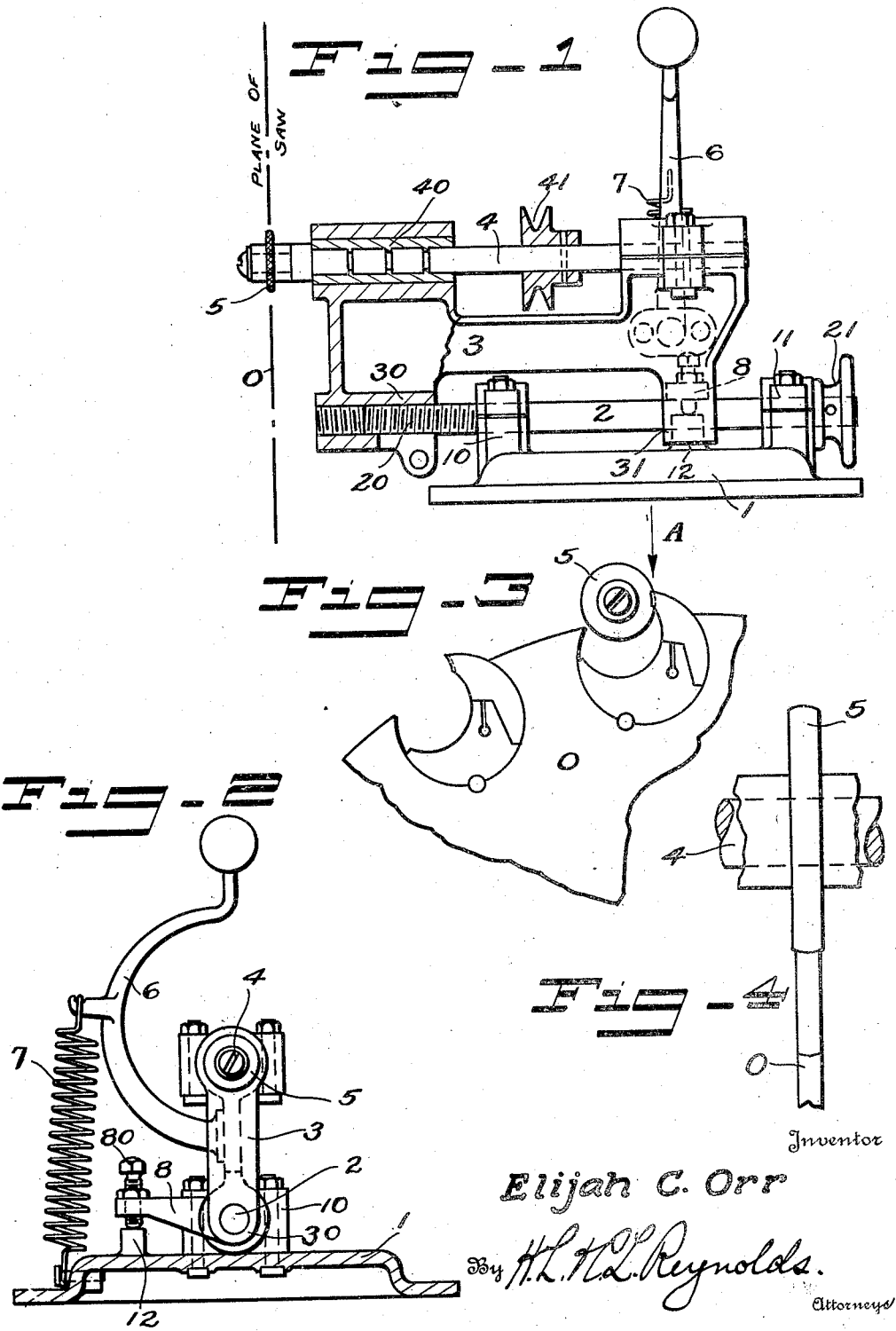

1,620,165

UNITED STATES PATENT OFFICE.

ELIJAH C. ORR, OF SEATTLE, WASHINGTON.

SAW-TOOTH GRINDER.

Application filed January 13, 1926. Serial No. 80,900.

My invention relates to grinding devices for the teeth of saws and consists of a machine of small size and simple construction carrying a rotative grinding wheel, and means by which said grinding wheel may be applied to the faces of the saw teeth, to thereby produce an even, regular and efficient shape for the tooth cutting edges.

One of the objects of my invention, in addition to securing the results above stated, is to so grind the saw teeth as to hollow grind or concave the cutting faces of the teeth, thereby giving them a more effective cutting shape.
My invention consists in the novel constructions whereby the grinding disk is supported and operated to apply it to the teeth faces.

The construction illustrated in the accompanying drawings and hereinafter described has been chosen as illustrative of the principles of my invention in a preferred form of construction. The novel features will be particularly defined by the claims terminating this specification.

Figure 1 is a side elevation of the device with portions of the frame in section.

Figure 2 is an end elevation of the device, showing the end which carries the grinding disk.

Figure 3 shows the manner of applying the grinding disk to the saw teeth.

Figure 4 is a view of the grinding disk as applied to the face of a saw tooth, illustrating the hollow ground character of teeth face, the direction of view being illustrated by the arrow A of Figure 3.

The present invention is an improvement upon the form of device shown in my Patent No. 1,488,056, issued March 25th, 1924. Its principle of operation, in so far as the result produced upon the saw teeth and the manner of producing such result, is the same.
The base 1, in the form illustrated, is designed to be placed upon or supported by a bench, table or any other suitable support. In the exact form of construction shown the device constitutes a portable machine. It is evident that the operating parts carried by this base may, without any change in principle, be mounted upon any other type of support or be incorporated in a machine having mechanisms for performing other operations upon the saw.

The base has bearings, as 10, 11, in which is journaled a pivot shaft or axis, 2, which is free to rock and be moved lengthwise in the bearings. Carried by this pivot shaft is a frame 3 which is provided with bearings for a rotative shaft 4, carrying means for turning it, as pulley 41 and held against axial reciprocative movement, as by the thrust members 40.

An overhanging end of this shaft carries a small grinding disk 5, small enough in diameter to enter the tooth receiving space of the saw, as is illustrated in Figure 3. As illustrated, this disk is but little thicker than the face of the saw tooth. It might, if desired, be made thicker. To secure the full hollow ground tooth effect, the cutting periphery of the grinding disk should be convexed. My present invention is, however, not necessarily confined to this feature but may be used with grinding disks having flat or square peripheries.

The arms, 30 and 31 of frame 3, which receive the pivot axis or shaft 2, are so spaced relative to the bearings 10 and 11 of the base, as to permit a limited reciprocation of the axis in its bearings. The purpose of this is to withdraw the grinder from the tooth recess, and to insert it therein, thus permitting turning the saw to present another tooth to the grinder.

The end of the pivot shaft 2 at the end of the machine opposite to that which carries the grinding disk, is provided with a knob, disk, or handle 21 by which the shaft 2 may be turned or reciprocated in adjusting the position of the frame relative to the base 1 or the saw. The plane of the saw, when a tooth is being ground, is indicated by the broken line O of Figure 1.

The arm 30 of the frame 3 and the end 20 of shaft 2 upon which it is secured, are threaded to thereby adjust the position of the frame and the grinding disk 5, relative to the base and also to the saw. The grinding of the tooth face occurs when the handle 21, or such other stop as may be employed, is in contact with a co-operating surface of the base 1.

To facilitate rocking movement of the frame, an operating arm 6 may be provided. To secure automatic return of the frame to the position where the grinding disk clears the tooth and saw faces, a spring 7 may be used. To limit such return movement to an exact position, a stop may be employed, as for instance, the arm 8 carrying an adjusting screw 80 which contacts with a rib 12 of the base extending parallel with the direction of reciprocation of the frame upon the base.

In operation the grinding machine is suitably supported in proper position with relation to the saw, which, if it be a circular saw is mounted upon a pivot axis so as to permit successive presentation of the teeth to the grinder. The frame 3 is withdrawn so as to clear the saw when the saw is being turned and then projected to enter the grinding disk in the tooth receiving recess. The frame is then positioned by engagement of the stop surfaces carried respectively by the pivot axis and the base. The frame is then rocked to contact the grinding disk with the edge of the tooth, as has been indicated in Figures 3 and 4. With a grinding disk having a convexed periphery, the tooth is hollow ground in a double sense.

What I claim as my invention is:

1. A saw grinding machine comprising a base, an adjusting pivot bar journaled in said base to turn and to permit lengthwise movement thereon, a frame having journaled therein a shaft carrying a grinding disk, said frame being mounted upon the said pivot bar and having threaded engagement therewith whereby the said frame may be adjusted lengthwise of the bar.

2. A saw grinding machine comprising a grinding disk, a pivoted frame upon which said grinding disk is rotatively mounted, and means for bodily adjustment of said pivoted frame lengthwise of its pivot axis.

3. A saw grinding machine comprising a base, a pivot shaft journaled therein to turn freely and to permit lengthwise movement, one end of said pivot shaft projecting beyond its bearing and being threaded, a frame mounted upon said pivot shaft and at one end having a socket threaded upon the threaded end of the pivot shaft, and a grinding member carried by said frame and adapted to be engaged with the tooth face of a saw by rocking of the frame upon its pivot.

4. A saw grinding machine comprising a base, a pivot shaft journaled therein to turn freely and to permit lengthwise movement, one end of said pivot shaft projecting beyond its bearing and being threaded, a frame mounted upon said pivot shaft and at one end having a socket threaded upon the threaded end of the pivot shaft, a shaft journaled in said frame and provided with means whereby it may be rotated, and a grinding disk carried by said shaft and adapted to enter the saw tooth notch.

5. A saw tooth grinder comprising a base, a pivot shaft journaled upon the base to be turnable and lengthwise reciprocable, a frame having a grinder shaft journaled therein and mounted upon the pivot shaft, said pivot shaft and frame having threaded engagement and the shaft carrying a stop limiting its lengthwise movement in the base.

Signed at Seattle, county of King, State of Washington, January, 1926.

ELIJAH C. ORR.